US010263287B2

(12) United States Patent
Abe et al.

(10) Patent No.: US 10,263,287 B2
(45) Date of Patent: Apr. 16, 2019

(54) NON-AQUEOUS ELECTROLYTE SOLUTION AND ELECTRICITY STORAGE DEVICE IN WHICH SAME IS USED

(71) Applicant: UBE INDUSTRIES, LTD., Ube-shi (JP)

(72) Inventors: Koji Abe, Sakai (JP); Kei Shimamoto, Sakai (JP)

(73) Assignee: UBE INDUSTRIES, LTD., Ube-shi (JP)

(*) Notice: Subject to any disclaimer, the term of this patent is extended or adjusted under 35 U.S.C. 154(b) by 167 days.

(21) Appl. No.: 15/324,800

(22) PCT Filed: Jul. 13, 2015

(86) PCT No.: PCT/JP2015/070052
§ 371 (c)(1),
(2) Date: Jan. 9, 2017

(87) PCT Pub. No.: WO2016/009994
PCT Pub. Date: Jan. 21, 2016

(65) Prior Publication Data
US 2017/0222268 A1 Aug. 3, 2017

(30) Foreign Application Priority Data
Jul. 15, 2014 (JP) ................................. 2014-144782

(51) Int. Cl.
H01M 10/0569 (2010.01)
H01G 11/06 (2013.01)
H01G 11/62 (2013.01)
H01M 10/052 (2010.01)
H01M 10/0568 (2010.01)
H01M 6/16 (2006.01)
H01G 11/60 (2013.01)
H01M 10/0525 (2010.01)
H01M 10/0562 (2010.01)

(52) U.S. Cl.
CPC ........ H01M 10/0569 (2013.01); H01G 11/06 (2013.01); H01G 11/60 (2013.01); H01G 11/62 (2013.01); H01M 6/16 (2013.01); H01M 10/052 (2013.01); H01M 10/0525 (2013.01); H01M 10/0562 (2013.01); H01M 10/0568 (2013.01); H01M 2300/0042 (2013.01); H01M 2300/0091 (2013.01); Y02E 60/13 (2013.01); Y02T 10/7022 (2013.01)

(58) Field of Classification Search
CPC ........ H01M 10/0569; H01M 10/0562; H01M 10/0525; H01M 10/0568; H01M 6/16; H01M 10/052; H01G 11/60; H01G 11/06; H01G 11/62
See application file for complete search history.

(56) References Cited

U.S. PATENT DOCUMENTS

| 9,515,348 B2* | 12/2016 | Tokuda ............ H01M 10/0567 |
| 2010/0119956 A1* | 5/2010 | Tokuda ................. H01M 4/134 |
| | | 429/338 |
| 2012/0282529 A1 | 11/2012 | Abe et al. |
| 2012/0308881 A1 | 12/2012 | Tokuda et al. |
| 2013/0022880 A1 | 1/2013 | Tsujioka et al. |
| 2013/0157147 A1* | 6/2013 | Li ........................ H01M 4/525 |
| | | 429/332 |
| 2013/0330610 A1 | 12/2013 | Shigematsu et al. |
| 2014/0045018 A1* | 2/2014 | Ikeda ................ H01M 10/0563 |
| | | 429/94 |
| 2014/0045054 A1* | 2/2014 | Komaba ............... H01M 4/622 |
| | | 429/188 |
| 2014/0154587 A1 | 6/2014 | Abe et al. |
| 2015/0221985 A1 | 8/2015 | Abe |

FOREIGN PATENT DOCUMENTS

| CN | 102725903 A | 10/2012 |
| CN | 102754268 A | 10/2012 |
| EP | 2 528 152 A1 | 11/2012 |
| EP | 2 528 154 A1 | 11/2012 |
| JP | 2007-165125 A | 6/2007 |
| JP | 2007-180015 A | 7/2007 |
| JP | 2008-269979 A | 11/2008 |
| JP | 2010-238504 A | 10/2010 |
| JP | 2011-82033 A | 4/2011 |
| JP | 2011-187440 A | 9/2011 |
| JP | 2011-222193 A | 11/2011 |
| JP | 2012-43627 A | 3/2012 |
| WO | WO 2014/021272 A1 | 2/2014 |

OTHER PUBLICATIONS

Extended European Search Report dated Mar. 6, 2018 in European Patent Application No. 15821448.6, 7 pages.
International Search Report dated Oct. 13, 2015 in PCT/JP2015/070052 filed Jul. 13, 2015.
Combined Chinese Office Action and Search Report dated Jul. 19, 2018 in Patent Application No. 201580036910.8 (with English language translation of categories of cited documents).

* cited by examiner

Primary Examiner — Stewart A Fraser
(74) Attorney, Agent, or Firm — Oblon, McClelland, Maier & Neustadt, L.L.P.

(57) ABSTRACT

Provided are a nonaqueous electrolytic solution having an electrolyte salt dissolved in a nonaqueous solvent, the electrolyte salt including at least one first lithium salt selected from $LiPF_6$, $LiBF_4$, $LiN(SO_2F)_2$, $LiN(SO_2CF_3)_2$, and $LiN(SO_2C_2F_5)_2$, and at least one second lithium salt selected from a lithium salt having an oxalate structure, a lithium salt having a phosphate structure, and a lithium salt having an S=O group, with a sum total of the first lithium salt and the second lithium salt being four or more, and an energy storage device using the same.
This nonaqueous electrolytic solution is not only able to improve electrochemical characteristics at a high temperature and much more improve a discharge capacity retention rate and low-temperature output characteristics after a high-temperature storage test but also able to improve low-temperature input characteristics even for high-density electrodes.

22 Claims, No Drawings

NON-AQUEOUS ELECTROLYTE SOLUTION AND ELECTRICITY STORAGE DEVICE IN WHICH SAME IS USED

TECHNICAL FIELD

The present invention relates to a nonaqueous electrolytic solution that is excellent in electrochemical characteristics at a high temperature and an energy storage device using the same.

BACKGROUND ART

An energy storage device, especially a lithium secondary battery, has been widely used recently for a power source of a small-sized electronic device, such as a mobile telephone, a notebook personal computer, etc., and a power source for an electric vehicle or electric power storage.

There is a high possibility that a battery mounted on such an electronic device or a vehicle is used at a high temperature in midsummer or in the environment warmed by the heat generation of the electronic device. With respect to a thin electronic device, such as a tablet device, an ultrabook, etc., a laminate-type battery or a prismatic battery using a laminate film, such as an aluminum laminate film, etc., for an outer packaging member thereof is frequently used. In such a battery, the outer packaging member is thin, and therefore, there is involved such a problem that the battery is liable to be deformed due to a bit of expansion of the outer packaging member, or the like, so that the deformation very likely influences the electronic device.

A lithium secondary battery is mainly constituted of a positive electrode and a negative electrode, each containing a material capable of absorbing and releasing lithium, and a nonaqueous electrolytic solution containing a lithium salt and a nonaqueous solvent; and a carbonate, such as ethylene carbonate (EC), propylene carbonate (PC), etc., is used as the nonaqueous solvent.

In addition, a metal lithium, a metal compound capable of absorbing and releasing lithium (e.g., a metal elemental substance, a metal oxide, an alloy with lithium, etc.), and a carbon material are known as the negative electrode of the lithium secondary battery. In particular, a nonaqueous electrolytic solution secondary battery using, as the carbon material, a carbon material capable of absorbing and releasing lithium, for example, coke or graphite (e.g., artificial graphite or natural graphite), etc., is widely put into practical use.

Since the aforementioned negative electrode material stores and releases lithium and an electron at an extremely electronegative potential equal to the metal lithium, it has a possibility that a lot of solvents are subjected to reductive decomposition especially at a high temperature, and a part of the solvent in the electrolytic solution is reductively decomposed on the negative electrode regardless of the kind of the negative electrode material, so that there were involved such problems that the movement of a lithium ion is disturbed due to deposition of decomposed products, generation of a gas, or expansion of the electrode, thereby worsening battery characteristics, such as cycle property, etc., especially in the case of using the battery at a high temperature; and that the battery is deformed due to expansion of the electrode. Furthermore, it is known that a lithium secondary battery using a metal lithium or an alloy thereof, a metal elemental substance, such as tin, silicon, etc., or a metal oxide thereof as the negative electrode material may have a high initial battery capacity, but the battery capacity and the battery performance thereof, such as the cycle property, may be largely worsened especially at a high temperature because the micronized powdering of the material may be promoted during cycles, which brings about accelerated reductive decomposition of the nonaqueous solvent, as compared with the negative electrode formed of a carbon material, and the battery may be deformed due to expansion of the electrode.

Meanwhile, since a material capable of absorbing and releasing lithium, which is used as a positive electrode material, such as $LiCoO_2$, $LiMn_2O_4$, $LiNiO_2$, $LiFePO_4$, etc., stores and releases lithium and an electron at an electropositive voltage of 3.5 V or more on the lithium basis, it has a possibility that a lot of solvents are subjected to oxidative decomposition especially in the case of using the battery at a high temperature, and a part of the solvent in the electrolytic solution is oxidatively decomposed on the positive electrode regardless of the kind of the positive electrode material, so that there was involved such a problem that the movement of a lithium ion is disturbed due to deposition of a decomposed product or generation of a gas, thereby worsening battery characteristics, such as cycle property, etc.

Irrespective of the foregoing situation, the multifunctionality of electronic devices on which lithium secondary batteries are mounted is more and more advanced, and power consumption tends to increase. The capacity of the lithium secondary battery is thus being much increased. Because of an increase of a density of the battery, a reduction of a useless space capacity within the battery, and so on, a volume occupied by the nonaqueous electrolytic solution in the battery is becoming small. In consequence, it is the present situation that the battery performance at a high temperature is apt to be lowered by decomposition of a bit nonaqueous electrolytic solution.

PTL 1 discloses a nonaqueous electrolyte solution for a secondary battery having a lithium salt dissolved in a nonaqueous solvent, which contains lithium bis(oxalate) borate as the lithium salt, further contains at least one compound selected from a compound having an S—F bond, a monofluorophosphate, a difluorophosphate, and the like in an amount of 10 ppm or more in the whole of the nonaqueous electrolytic solution, and still further contains $LiPF_6$. PTL 1 describes that the output characteristics, high-temperature storage property, and cycle property are excellent.

PTL 2 discloses an electrolytic solution for a nonaqueous electrolytic solution battery composed of a nonaqueous organic solvent and a solute, which contains, as additives, at least one compound selected from a first compound group having an oxalate structure, which is composed of difluoro(oxalate)borate, difluoro(bisoxalate)phosphate, and the like, and at least one compound selected from a second compound group composed of a monofluorophosphate and a difluorophosphate. PTL 2 describes that the cycle property and durability can be improved.

PTL 3 discloses a nonaqueous electrolytic solution containing a nonaqueous solvent, $LiPF_6$, and a specified fluorosulfonate, in which a ratio of the molar content of $FSO_3$ to the molar content of $PF_6$ is 0.001 to 1.2, and which further contains 0.0005 to 0.5 mol/L of a lithium fluorophosphate. PTL 3 describes that the initial discharge capacity, impedance characteristics, and output characteristics are excellent.

PTL 4 discloses an electrolytic solution for a nonaqueous electrolytic battery containing a nonaqueous organic solvent and a solute, which contains, as additives, difluoro(bisoxalate)phosphate and tetrafluoro(oxalate)phosphate together.

PTL 4 describes that the cycle property, high-temperature storage property, and low-temperature properties can be improved.

CITATION LIST

Patent Literature

PTL 1: JP 2007-180015 A
PTL 2: JP 2007-165125 A
PTL 3: JP 2011-187440 A
PTL 4: JP 2011-222193 A

DISCLOSURE OF INVENTION

Technical Problem

In conventional electrodes of on-board energy storage devices, in order to enhance input-output characteristics, usually, it was general to apply thin coating in a low density. However, in order to increase the energy density, it is necessary to make the electrode density or electrode thickness large more and more. In such a battery, there was involved such a problem that the performance at an extremely low temperature after high-temperature storage is remarkably worsened.

The present inventors made extensive and intensive investigations regarding the performances of the nonaqueous electrolytic solutions of the aforementioned PTLs 1 to 4. As a result, though the nonaqueous electrolytic solutions of PTLs 1 to 4 can improve the high-temperature cycle property and the low-temperature output characteristics after high-temperature cycles, in the case of contemplating to further increase the battery capacity in the future, they could not be thoroughly satisfied. In addition, the aforementioned PTLs 1 to 4 do not disclose at all an improvement of low-temperature input characteristics after high-temperature storage.

A problem of the present invention is to provide a nonaqueous electrolytic solution that is not only able to improve electrochemical characteristics at a high temperature and much more improve a discharge capacity retention rate and low-temperature output characteristics after a high-temperature storage test but also able to improve low-temperature input characteristics even for high-density electrodes, and an energy storage device using the same.

Solution to Problem

In order to solve the aforementioned problem, the present inventors made extensive and intensive investigations. As a result, it has been found that by containing four or more kinds in total of lithium salts including a main electrolyte salt and further at least three kinds of specified lithium salts in a nonaqueous electrolytic solution, not only a discharge capacity retention rate after high-temperature storage and low-temperature output characteristics after high-temperature storage can be improved, but also low-temperature input characteristics after high-temperate storage can be improved, leading to accomplishment of the present invention.

Specifically, the present invention provides the following (1) and (2).
(1) A nonaqueous electrolytic solution having an electrolyte salt dissolved in a nonaqueous solvent, the electrolyte salt including at least one first lithium salt selected from $LiPF_6$, $LiBF_4$, $LiN(SO_2F)_2$, $LiN(SO_2CF_3)_2$, and $LiN(SO_2C_2F_5)_2$, and at least one second lithium salt selected from a lithium salt having an oxalate structure, a lithium salt having a phosphate structure, and a lithium salt having an S=O group, with a sum total of the first lithium salt and the second lithium salt being four or more.
(2) An energy storage device including a positive electrode, a negative electrode, and a nonaqueous electrolytic solution having an electrolyte salt dissolved in a nonaqueous solvent, the electrolyte salt including at least one first lithium salt selected from $LiPF_6$, $LiBF_4$, $LiN(SO_2F)_2$, $LiN(SO_2CF_3)_2$, and $LiN(SO_2C_2F_5)_2$, and at least one second lithium salt selected from a lithium salt having an oxalate structure, a lithium salt having a phosphate structure, and a lithium salt having an S=O group, with a sum total of the first lithium salt and the second lithium salt being four or more.

Advantageous Effects of Invention

In accordance with the present invention, it is possible to provide a nonaqueous electrolytic solution that is not only able to improve a discharge capacity retention rate after high-temperature storage and low-temperature output characteristics after high-temperature storage but also able to improve low-temperature input characteristics after high-temperate storage, and an energy storage device using the same, such as a lithium battery, etc.

DESCRIPTION OF EMBODIMENTS

[Nonaqueous Electrolytic Solution]

The nonaqueous electrolytic solution of the present invention is a nonaqueous electrolytic solution having an electrolyte salt dissolved in a nonaqueous solvent, the electrolyte salt including at least one first lithium salt selected from $LiPF_6$, $LiBF_4$, $LiN(SO_2F)_2$, $LiN(SO_2CF_3)_2$, and $LiN(SO_2C_2F_5)_2$, and a second lithium salt selected from a lithium salt having an oxalate structure, a lithium salt having a phosphate structure, and a lithium salt having an S=O group, with a sum total of the first lithium salt and the second lithium salt being four or more.

Although the reasons why the nonaqueous electrolytic solution of the present invention is not only able to improve a discharge capacity retention rate after high-temperature storage and low-temperature output characteristics after high-temperature storage but also able to improve low-temperature input characteristics after high-temperate storage are not always elucidated yet, the following may be considered.

Although the first lithium salt that is used as a main electrolyte salt in the present invention, such as $LiPF_6$, etc., is an excellent lithium salt, it is decomposed on the negative electrode at a high temperature, whereby the concentration of the main electrolyte salt is decreased, and the input-output characteristics after high-temperature storage, especially input characteristics, at a low temperature after high-temperature storage are worsened due to accumulation of decomposed products.

Meanwhile, it has been found that by using three or more kinds of second lithium salts selected from a lithium salt having an oxalate structure, a lithium salt having a phosphate structure, and a lithium salt having an S=O group in combination, not only decomposition of $LiPF_6$ or the like on the negative electrode can be suppressed, but also these second lithium salts are able to enhance thermal stability of a $PF_6$ anion or the like.

Then, it may be considered that by using the both in combination, decomposition of the first lithium salt, such as LiPF$_6$, etc., on the negative electrode is suppressed, a complex surface film (SEI film) that is firm and excellent in lithium permeability is formed on the negative electrode to improve the high-temperature storage property, and the growth of the surface film during the high-temperature storage is suppressed, so that the input-output characteristics at a low temperature can be enhanced. It may be considered that in view of the fact that the four or more anions having a different ionic radius from each other are included in the nonaqueous electrolytic solution, the solvation state of lithium ions changes, and diffusion of the lithium ions in the nonaqueous electrolytic solution is promoted, and therefore, even after storage at a high temperature, high input-output characteristics can be exhibited.

<First Lithium Salt>

The first lithium salt that is included in the nonaqueous electrolytic solution of the present invention is at least one selected from LiPF$_6$, LiBF$_4$, LiN(SO$_2$F)$_2$ [LiFSI], LiN(SO$_2$CF$_3$)$_2$ [LiTFSI], LiN(SO$_2$C$_2$F$_5$)$_2$, and LiN(SO$_2$C$_2$F$_5$)$_2$ and is used as a main electrolyte salt.

Of the first lithium salts, LiPF$_6$ is most preferred.

Examples of a suitable combination of the first lithium salts include the case where LiPF$_6$ is included, and at least one lithium salt selected from LiBF$_4$, LiFSI, and LiTFSI is further included in the nonaqueous electrolytic solution.

(Concentration of First Lithium Salt)

In general, a concentration of the first lithium salt is preferably 0.3 M or more, more preferably 0.7 M or more, and still more preferably 1.1 M or more relative to the nonaqueous solvent. An upper limit thereof is preferably 2.5 M or less, more preferably 2.0 M or less, and still more preferably 1.6 M or less.

In the case of using, as the first lithium salt, a combination of LiPF$_6$ and at least one selected from LiBF$_4$, LiFSI, and LiTFSI, when a proportion of the lithium salt other than LiPF$_6$ occupying in the nonaqueous solvent is 0.001 M or more, an effect for improving the electrochemical characteristics at a high temperature is easily exhibited, whereas when it is 0.8 M or less, there is less concern that an effect for improving the electrochemical characteristics at a high temperature is worsened, and hence, such is preferred. The proportion of the lithium salt other than LiPF$_6$ in the nonaqueous solvent is preferably 0.01 M or more, more preferably 0.03 M or more, and still more preferably 0.04 M or more, and the upper limit thereof is preferably 0.7 M or less, and more preferably 0.5 M or less.

<Second Lithium Salt>

The second lithium salt that is included in the nonaqueous electrolytic solution of the present invention is at least one selected from a lithium salt having an oxalate structure, a lithium salt having a phosphate structure, and a lithium salt having an S=O group.

Among those, when one or more lithium salts having an oxalate structure and two or more lithium salts selected from a lithium salt having a phosphate structure and a lithium salt having an S=O group are included, not only the discharge capacity retention rate after high-temperature storage and the low-temperature output characteristics after high-temperature storage may be more improved, but also the low-temperature input characteristics after high-temperate storage may be improved, and hence, such is preferred.

It is more preferred that the nonaqueous electrolytic solution includes three or more kinds in total of lithium salts including one or more lithium salts having an oxalate structure, one or more lithium salts having a phosphate structure, and one or more lithium salts having an S=O group.

The lithium salts selected from the first lithium salt and the second lithium salt are more preferably five or more kinds in total.

Suitable examples of the lithium salt having an oxalate structure that is included in the nonaqueous electrolytic solution of the present invention include one or more selected from lithium bis(oxalate)borate, lithium difluoro(oxalate)borate, lithium tetrafluoro(oxalate)phosphate, and lithium difluorobis(oxalate)phosphate. Among those, one or more selected from lithium bis(oxalate)borate (LiBOB), lithium difluoro(oxalate)borate (LiDFOB), and lithium difluorobis(oxalate)phosphate (LiDFOP) are more preferred.

In the case where two or more lithium salts having an oxalate structure are included in the nonaqueous electrolytic solution, it is more preferred that both a lithium salt having two oxalate structures and a lithium salt having one oxalate structure are included; and it is still more preferred that the lithium salt having two oxalate structures is included in a larger amount than the lithium salt having one oxalate structure.

Suitable examples of the lithium salt having a phosphate structure include one or more selected from lithium difluorophosphate (LiPO$_2$F$_2$) and lithium fluorophosphate (Li$_2$PO$_3$F). Of those, LiPO$_2$F$_2$ is preferred.

Suitable examples of the lithium salt having an S=O group include one or more selected from lithium fluorosulfonate (FSO$_3$Li), lithium methyl sulfate, lithium ethyl sulfate, lithium 2,2,2-trifluoroethyl sulfate, lithium trifluoro((methanesulfonyl)oxy)borate, and lithium pentafluoro((methanesulfonyl)oxy)phosphate. Among those, one or more selected from lithium methyl sulfate (LMS), lithium ethyl sulfate (LES), FSO$_3$Li, and lithium trifluoro((methanesulfonyl)oxy)borate (LiTFMSB) are preferred, a lithium salt having an SO$_4$ group is more preferred, and one or more selected from LMS and LES are still more preferred.

In the case where the lithium salt having an S=O group that is included in the nonaqueous electrolytic solution of the present invention is a lithium salt having an SO$_4$ group, not only the low-temperature output characteristics after high-temperature storage may be more improved, but also the low-temperature input characteristics after high-temperature storage and the discharge capacity retention rate after high-temperature storage may be improved, and hence, such is preferred. It is more preferred that two or more lithium salts having an SO$_4$ group are included.

(Concentration of Second Lithium Salt)

In general, from the viewpoint of improving the electrochemical characteristics at a high temperature, the discharge capacity retention rate after a high-temperature storage test, and the low-temperature output characteristics, a concentration of the second lithium salt is preferably 0.002 M or more, more preferably 0.005 M or more, and still more preferably 0.01 M or more relative to the nonaqueous solvent, and an upper limit thereof is preferably 0.5 M or less, more preferably 0.4 M or less, and still more preferably 0.3 M or less.

In the nonaqueous electrolytic solution of the present invention, a content of the lithium salt having an oxalate structure is preferably 0.001 to 0.2 M in the nonaqueous electrolytic solution. When the content is 0.2 M or less, there is less concern that a surface film is excessively formed on the electrode, thereby worsening the low-temperature input characteristics after high-temperature storage, whereas when it is 0.001 M or more, an effect for enhancing the stability of the first lithium salt is sufficient, and an improving effect of the discharge capacity retention rate after high-temperature storage is enhanced. The content is preferably 0.005 M or more, and more preferably 0.01 M or more in the nonaqueous electrolytic solution, and an upper limit thereof is preferably 0.15 M or less, and more preferably 0.12 M or less.

A content of each of the lithium salt having a phosphate structure and the lithium salt having an S=O group is preferably 0.001 to 0.3 M in the nonaqueous electrolytic solution, and a total amount of the both is also preferably 0.001 to 0.3 M in the nonaqueous electrolytic solution. When the content is 0.3 M or less, there is less concern that a surface film is excessively formed on the electrode, thereby worsening the low-temperature input characteristics after high-temperature storage, whereas when it is 0.001 M or more, an effect for enhancing the stability of the first lithium salt is sufficient, and an improving effect of the discharge capacity retention rate after high-temperature storage is enhanced. The content is preferably 0.01 M or more, and more preferably 0.03 M or more in the nonaqueous electrolytic solution, and an upper limit thereof is preferably 0.15 M or less, and more preferably 0.12 M or less.

A ratio of a total molar concentration of the first lithium salt to a total molar concentration of the second lithium salt {(first lithium salt concentration)/(second lithium salt concentration)} is preferably 1 or more, more preferably 2 or more, still more preferably 3 or more, yet still more preferably 4 or more, and even yet still more preferably 5 or more.

When the total molar concentration of the second lithium salt is smaller than the molar concentration of the first lithium salt, there is no concern that a surface film is excessively formed on the electrode, thereby worsening the low-temperature input characteristics after high-temperature storage, and the stability of the first lithium salt may be enhanced, and hence, such is preferred.

(Content Ratio of Second Lithium Salt)

In the case where the second lithium salt is composed of three kinds of a lithium salt having two oxalate structures, a lithium salt having one oxalate structure, and a lithium salt having a phosphate structure, when a ratio (O2/O1) of a content (O2) of the lithium salt having two oxalate structures, to a content (O1) of the lithium salt having one oxalate structure is preferably 99/1 to 51/49, and a ratio [(O1+O2)/P] of a total content (O1+O2) of the two lithium salts having an oxalate structure to a content (P) of the lithium salt having a phosphate structure is 25/75 to 50/50, the low-temperature input characteristics after high-temperature storage may be improved, and the input characteristics may be greatly improved, and hence, such is preferred.

It is more preferred that the ratio (O2/O1) of the content (O2) of the lithium salt having two oxalate structures, to the content (O1) of the lithium salt having one oxalate structure is 99/1 to 75/25, and the ratio [(O1+O2)/P] of the total content (O1+O2) of the two lithium salts having an oxalate structure to the content (P) of the lithium salt having a phosphate structure is 25/75 to 40/60, and it is especially preferred that the ratio (O2/O1) is 99/1 to 90/10, and the ratio [(O1+O2)/P] is 25/75 to 30/70.

(HF Concentration)

A lower limit of a concentration of HF that is included in the nonaqueous electrolytic solution of the present invention is suitably 1 ppm or more, and preferably 2 ppm or more. When the HF concentration is the aforementioned lower limit value or more, not only the discharge capacity retention rate after high-temperature storage and the low-temperature output characteristics after high-temperature storage may be more improved, but also the low-temperature input characteristics after high-temperature storage may be improved, and hence, such is preferred. An upper limit of the HF concentration is suitably 50 ppm or less, and when it is preferably 20 ppm or less, and more preferably 8 ppm or less, not only the discharge capacity retention rate after high-temperature storage and the low-temperature output characteristics after high-temperature storage may be more improved, but also the low-temperature input characteristics after high-temperature storage is improved, and hence, such is preferred.

In the second lithium salt, a ratio of the sum total of the fluorine-containing lithium salt concentration and the HF concentration {(HF concentration)/(sum total of the second lithium salt concentration)} is suitably 1/10,000 to 1/20. An upper limit of the aforementioned ratio is preferably 1/220 or less, and more preferably 1/500 or less.

[Nonaqueous Solvent]

Suitable examples of the nonaqueous solvent that is used for the nonaqueous electrolytic solution of the present invention include one or more selected from a cyclic carbonate, a linear ester, a lactone, an ether, and an amide. In order that the electrochemical characteristics may be synergistically improved at a high temperature, it is preferred that a linear ester is included, and it is more preferred that both a cyclic carbonate and a linear ester are included.

The term "linear ester" is used as a concept including a linear carbonate and a linear carboxylic acid ester.

<Cyclic Carbonate>

Examples of the cyclic carbonate include one or more selected from ethylene carbonate (EC), propylene carbonate (PC), 1,2-butylene carbonate, 2,3-butylene carbonate, 4-fluoro-1,3-dioxolan-2-one (FEC), trans- or cis-4,5-difluoro-1,3-dioxolan-2-one (the both will be hereunder named generically as "DFEC"), vinylene carbonate (VC), vinyl ethylene carbonate (VEC), and 4-ethynyl-1,3-dioxolan-2-one (EEC). One or more selected from ethylene carbonate, propylene carbonate, 4-fluoro-1,3-dioxolan-2-one, vinylene carbonate, and 4-ethynyl-1,3-dioxolan-2-one (EEC) are more suitable.

Use of at least one of cyclic carbonates having an unsaturated bond, such as a carbon-carbon double bond, a carbon-carbon triple bond, etc., or a fluorine atom is preferred because the electrochemical characteristics at a high temperature are much more improved. It is more preferred that both a cyclic carbonate having an unsaturated bond, such as a carbon-carbon double bond, a carbon-carbon triple bond, etc., and a cyclic carbonate having a fluorine atom are included. As the cyclic carbonate having an unsaturated bond, such as a carbon-carbon double bond, a carbon-carbon triple bond, etc., VC, VEC, or EEC is more preferred, and as the cyclic carbonate having a fluorine atom, FEC or DFEC is more preferred.

(Content of Cyclic Carbonate)

When a content of the cyclic carbonate having an unsaturated bond, such as a carbon-carbon double bond, a carbon-carbon triple bond, etc., is preferably 0.07% by volume or more, more preferably 0.2% by volume or more, and still more preferably 0.7% by volume or more relative to a total volume of the nonaqueous solvent, and an upper limit thereof is preferably 7% by volume or less, more preferably 4% by volume or less, and still more preferably 2.5% by volume or less, the stability of a surface film at a high temperature may be much more increased without impairing the Li ion permeability, and hence, such is preferred.

When a content of the cyclic carbonate having a fluorine atom is preferably 0.07% by volume or more, more preferably 4% by volume or more, and still more preferably 7% by volume or more relative to a total volume of the nonaqueous solvent, and an upper limit thereof is 35% by volume or less, more preferably 25% by volume or less, and still more preferably 15% by volume or less, the stability of a surface film at a high temperature may be much more increased without impairing the Li ion permeability, and hence, such is preferred.

In the case where the nonaqueous solvent includes both the cyclic carbonate having an unsaturated bond, such as a carbon-carbon double bond, a carbon-carbon triple bond, etc., and the cyclic carbonate having a fluorine atom, when a proportion of the content of the cyclic carbonate having an unsaturated bond, such as a carbon-carbon double bond, a carbon-carbon triple bond, etc., to the content of the cyclic carbonate having a fluorine atom is preferably 0.2% by volume or more, more preferably 3% by volume or more, and still more preferably 7% by volume or more, and an upper limit thereof is preferably 40% by volume or less, more preferably 30% by volume or less, and still more preferably 15% by volume or less, the stability of a surface film at a high temperature may be much more increased without impairing the Li ion permeability, and hence, such is especially preferred.

When the nonaqueous solvent includes both ethylene carbonate and the cyclic carbonate having an unsaturated bond, such as a carbon-carbon double bond, a carbon-carbon triple bond, etc., the stability of a surface film formed on the electrode at a high temperature is increased, and hence, such is preferred. A content of ethylene carbonate and the cyclic carbonate having an unsaturated bond, such as a carbon-carbon double bond, a carbon-carbon triple bond, etc., is preferably 3% by volume or more, more preferably 5% by volume or more, and still more preferably 7% by volume or more relative to a total volume of the nonaqueous solvent, and an upper limit thereof is preferably 45% by volume or less, more preferably 35% by volume or less, and still more preferably 25% by volume or less.

These solvents may be used solely; in the case where a combination of two or more of the solvents is used, the electrochemical characteristics at a high temperature are more improved, and hence, such is preferred; and use of a combination of three or more thereof is especially preferred. As suitable combinations of these cyclic carbonates, EC and PC; EC and VC; PC and VC; VC and FEC; EC and FEC; PC and FEC; FEC and DFEC; EC and DFEC; PC and DFEC; VC and DFEC; VEC and DFEC; VC and EEC; EC and EEC; EC, PC and VC; EC, PC and FEC; EC, VC and FEC; EC, VC and VEC; EC, VC and EEC; EC, EEC and FEC; PC, VC and FEC; EC, VC and DFEC; PC, VC and DFEC; EC, PC, VC and FEC; EC, PC, VC and DFEC; and the like are preferred. Among the aforementioned combinations, a combination, such as EC and VC; EC and FEC; PC and FEC; EC, PC and VC; EC, PC and FEC; EC, VC and FEC; EC, VC and EEC; EC, EEC and FEC; PC, VC and FEC; EC, PC, VC and FEC; etc., is more preferred.

<Linear Ester>

As the linear ester, there are suitably exemplified one or more asymmetric linear carbonates selected from methyl ethyl carbonate (MEC), methyl propyl carbonate (MPC), methyl isopropyl carbonate (MIPC), methyl butyl carbonate, and ethyl propyl carbonate; one or more symmetric linear carbonates selected from dimethyl carbonate (DMC), diethyl carbonate (DEC), dipropyl carbonate, and dibutyl carbonate; and one or more linear carboxylic acid esters selected from methyl propionate (MP), ethyl propionate (EP), propyl propionate (PP), methyl acetate (MA), ethyl acetate (EA), and propyl acetate (PA).

Among the linear esters, a linear ester having a methyl group, which is selected from dimethyl carbonate, methyl ethyl carbonate, methyl propyl carbonate, methyl isopropyl carbonate, and methyl butyl carbonate; and a linear carboxylic acid ester selected from methyl propionate (MP), ethyl propionate (EP), and propyl propionate (PP) are preferred. It is especially preferred that a linear carboxylic acid ester is contained.

In the case of using a linear carbonate, it is preferred to use two or more thereof. Furthermore, it is more preferred that both the symmetric linear carbonate and the asymmetric linear carbonate are included, and it is still more preferred that a content of the symmetric linear carbonate is more than a content of the asymmetric linear carbonate.

(Content of Linear Ester)

Although a content of the linear ester is not particularly limited, it is preferred to use the linear ester in an amount in the range of from 60 to 90% by volume relative to a total volume of the nonaqueous solvent. When the content is 60% by volume or more, the viscosity of the nonaqueous electrolytic solution does not become excessively high, and when it is 90% by volume or less, there is less concern that an electroconductivity of the nonaqueous electrolytic solution is decreased, whereby the electrochemical characteristics at a high temperature are worsened, and therefore, it is preferred that the content of the linear ester falls within the aforementioned range.

A proportion of the volume of the symmetric linear carbonate occupying in the linear carbonate is preferably 51% by volume or more, and more preferably 55% by volume or more. An upper limit thereof is preferably 95% by volume or less, and more preferably 85% by volume or less. It is especially preferred that dimethyl carbonate is included in the symmetric linear carbonate. It is more preferred that the asymmetric linear carbonate has a methyl group, and methyl ethyl carbonate is especially preferred. The aforementioned case is preferred because the electrochemical characteristics at a high temperature are much more improved.

As for a proportion of the cyclic carbonate and the linear ester, from the viewpoint of improving the electrochemical characteristics at a high temperature, a ratio of the cyclic carbonate to the linear ester (volume ratio) is preferably 10/90 to 45/55, more preferably 15/85 to 40/60, and especially preferably 20/80 to 35/65.

(Other Nonaqueous Solvents)

As other nonaqueous solvents, there are suitably exemplified one or more selected from a cyclic ether, such as tetrahydrofuran, 2-methyltetrahydrofuran, 1,4-dioxane, etc.; a linear ether, such as 1,2-dimethoxyethane, 1,2-diethoxyethane, 1,2-dibutoxyethane, etc.; an amide, such as dimethylformamide, etc.; a sulfone, such as sulfolane, etc.; and a lactone, such as γ-butyrolactone, γ-valerolactone, α-angelicalactone, etc.

In general, the nonaqueous solvents are mixed and used for the purpose of attaining appropriate physical properties. Suitable examples of a combination thereof include a combination of a cyclic carbonate and a linear carbonate; a combination of a cyclic carbonate and a linear carboxylic acid ester; a combination of a cyclic carbonate, a linear carbonate, and a lactone; a combination of a cyclic carbonate, a linear carbonate, and an ether; a combination of a cyclic carbonate, a linear carbonate, and a linear carboxylic acid ester; and the like.

(Other Additives)

For the purpose of much more improving the stability of a surface film at a high temperature, it is preferred to further add other additives in the nonaqueous electrolytic solution.

Specific examples of other additives include the following compounds (A) to (I).

(A) One or more nitriles selected from acetonitrile, propionitrile, succinonitrile, glutaronitrile, adiponitrile, pimelonitrile, suberonitrile, and sebaconitrile.

(B) Aromatic compounds having a branched alkyl group, such as cyclohexylbenzene, fluorocyclohexylbenzene compounds (e.g., 1-fluoro-2-cyclohexylbenzene, 1-fluoro-3-cyclohexylbenzene, or 1-fluoro-4-cyclohexylbenzene), tert-butylbenzene, tert-amylbenzene, 1-fluoro-4-tert-butylbenzene, etc.; and aromatic compounds, such as biphenyl, terphenyl (o-, m-, p-form), diphenyl ether, fluorobenzene, difluorobenzene (o-, m-, p-form), anisole, 2,4-difluoroanisole, partial hydrides of terphenyl (e.g., 1,2-dicyclohexylbenzene, 2-phenylbicyclohexyl, 1,2-diphenylcyclohexane, or o-cyclohexylbiphenyl), etc.

(C) One or more isocyanate compounds selected from methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, 2-isocyanatoethyl acrylate, and 2-isocyanatoethyl methacrylate.

(D) One or more triple bond-containing compounds selected from 2-propynyl methyl carbonate, 2-propynyl acetate, 2-propynyl formate, 2-propynyl methacrylate, 2-propynyl methanesulfonate, 2-propynyl vinylsulfonate, 2-propynyl 2-(methanesulfonyloxy)propionate, di(2-propynyl) oxalate, methyl 2-propynyl oxalate, ethyl 2-propynyl oxalate, di(2-propynyl) glutarate, 2-butyne-1,4-diyl dimethanesulfonate, 2-butyne-1,4-diyl diformate, and 2,4-hexadiyne-1,6-diyl dimethanesulfonate.

(E) One or more S=O group-containing compounds selected from sultones, such as 1,3-propanesultone, 1,3-butanesultone, 2,4-butanesultone, 1,4-butanesultone, 1,3-propenesultone, 2,2-dioxide-1,2-oxathiolane-4-yl acetate, 5,5-dimethyl-1,2-oxathiolane-4-one 2,2-dioxide, etc.; cyclic sulfates, such as ethylene sulfite, hexahydrobenzo[1,3,2]dioxathiolane-2-oxide (also called 1,2-cyclohexanediol cyclic sulfite), 5-vinyl-hexahydro-1,3,2-henzodioxathiol-2-oxide, etc.; cyclic sulfates, such as ethylene sulfate, propylene sulfate, [4,4'-bi(1,3,2-dioxathiolane)]2,2,2',2'-tetraoxide, (2,2-dioxido-1,3,2-dioxathiolane-4-yl)methyl methanesulfonate, 4-((methylsulfonyl)methyl)-1,3,2-dioxathiolane 2,2-dioxide, etc.; sulfonic acid esters, such as butane-2,3-diyl dimethanesulfonate, butane-1,4-diyl dimethanesulfonate, dimethyl methanedisulfonate, pentafluorophenyl methanesulfonate, etc.; and vinylsulfone compounds, such as divinylsulfone, 1,2-bis(vinylsulfonyl)ethane, bis(2-vinylsulfonylethyl) ether, etc.

(F) Cyclic acetal compounds, such as 1,3-dioxolane, 1,3-dioxane, 1,3,5-trioxane, etc.

(G) One or more phosphorus-containing compounds selected from trimethyl phosphate, tributyl phosphate, trioctyl phosphate, tris(2,2,2-trifluoro ethyl)phosphate, bis(2,2,2-trifluoroethyl) methyl phosphate, bis(2,2,2-trifluoro ethyl) ethyl phosphate, bis(2,2,2-trifluoro ethyl) 2,2-difluoro ethyl phosphate, bis (2,2,2-trifluoro ethyl) 2,2,3,3-tetrafluoropropyl phosphate, bis(2,2-difluoro ethyl) 2,2,2-trifluoro ethyl phosphate, bis(2,2,3,3-tetrafluoropropyl) 2,2,2-trifluoroethyl phosphate, (2,2,2-trifluoro ethyl) (2,2,3,3-tetrafluoropropyl)methyl phosphate, tris(1,1,1,3,3,3-hexafluoropropan-2-yl) phosphate, methyl methylenebisphosphonate, ethyl methylenebisphosphonate, methyl ethylenebisphosphonate, ethyl ethylenebisphosphonate, methyl butylenebisphosphonate, ethyl butylenebisphosphonate, methyl 2-(dimethylphosphorynacetate, ethyl 2-(dimethylphosphoryl)acetate, methyl 2-(diethylphosphoryl)acetate, ethyl 2-(diethylphosphorypacetate, 2-propynyl 2-(dimethylphosphoryl)acetate, 2-propynyl 2-(diethylphosphoryl)acetate, methyl 2-(dimethoxyphosphoryl)acetate, ethyl 2-(dimethoxyphosphoryl)acetate, methyl 2-(diethoxyphosphoryl) acetate, ethyl 2-(diethoxyphosphorynacetate, 2-propynyl 2-(dimethoxyphosphoryl)acetate, 2-propynyl 2-(diethoxyphosphoryl)acetate, methyl pyrophosphate, and ethyl pyrophosphate.

(H) Linear carboxylic acid anhydrides, such as acetic anhydride, propionic anhydride, etc.; and cyclic acid anhydrides, such as succinic anhydride, maleic anhydride, 3-allylsuccinic anhydride, glutaric anhydride, itaconic anhydride, 3-sulfo-propionic anhydride, etc.

(I) Cyclic phosphazene compounds, such as methoxypentafluorocyclotriphosphazene, ethoxypentafluorocyclotriphosphazene, phenoxypentafluorocyclotriphosphazene, ethoxyheptafluorocyclotetraphosphazene, etc.

Of the foregoing, when at least one selected from the nitriles (A), the aromatic compounds (B), and the isocyanate compounds (C) is included, the low-temperature input characteristics after high-temperature storage are much more improved, and hence, such is preferred.

Of the nitriles (A), one or more selected from succinonitrile, glutaronitrile, adiponitrile, and pimelonitrile are more preferred.

Of the aromatic compounds (B), one or more selected from biphenyl, terphenyl (o-, m-, p-form), fluorobenzene, cyclohexylbenzene, tert-butylbenzene, and tert-amylbenzene are more preferred; and one or more selected from biphenyl, o-terphenyl, fluorobenzene, cyclohexylbenzene, and tert-amylbenzene are especially preferred.

Of the isocyanate compounds (C), one or more selected from hexamethylene diisocyanate, octamethylene diisocyanate, 2-isocyanatoethyl acrylate, and 2-isocyanatoethyl methacrylate are more preferred.

A content of each of the aforementioned compounds (A) to (C) is preferably 0.01 to 7% by mass in the nonaqueous electrolytic solution. When the content falls within this range, a surface film is sufficiently formed without causing an excessive increase of the thickness, and the stability of the surface film at a high temperature is much more enhanced. The content is more preferably 0.05% by mass or more, and still more preferably 0.1% by mass or more in the nonaqueous electrolytic solution, and an upper limit thereof is more preferably 5% by mass or less, and still more preferably 3% by mass or less.

When the triple bond-containing compound (D), the cyclic or linear S=O group-containing compound (E) selected from sultones, cyclic sulfites, cyclic sulfates, sulfonic acid esters, and vinylsulfones, the cyclic acetal compound (F), the phosphorus-containing compound (G), the cyclic acid anhydride (H), or the cyclic phosphazene compound (I) is included, the stability of a surface film at a high temperature is much more improved, and hence, such is preferred.

As the triple bond-containing compound (D), one or more selected from 2-propynyl methanesulfonate, 2-propynyl vinylsulfonate, 2-propynyl 2-(methanesulfonyloxy)propionate, di(2-propynyl) oxalate, and 2-butyne-1,4-diyl dimethanesulfonate are more preferred.

As the cyclic or linear S=O group-containing compound (E), one or more selected from 1,3-propenesultone, 1,4-butanesultone, 2,4-butane sultone, 2,2-dioxide-1,2-oxathiolane-4-yl acetate, 5,5-dimethyl-1,2-oxathiolane-4-one 2,2-dioxide, butane-2,3-diyl dimethanesulfonate, pentafluorophenyl methanesulfonate, and divinylsulfone are more preferred.

As the cyclic acetal compound (F), 1,3-dioxolane and 1,3-dioxane are preferred, and 1,3-dioxane is more preferred.

As the phosphorus-containing compound (G), tris(2,2,2-trifluoroethyl) phosphate, tris (1,1,1,3,3,3-hexafluoropropan-2-yl) phosphate, ethyl 2-(diethylphosphoryl)acetate, 2-propynyl 2-(dimethylphosphoryl)acetate, 2-propynyl 2-(diethylphosphoryl)acetate, ethyl 2-(diethoxyphosphoryl)acetate, 2-propynyl 2-(dimethoxyphosphoryl)acetate, and 2-propynyl 2-(diethoxyphosphoryl)acetate are more preferred.

As the cyclic acid anhydride (H), succinic anhydride, maleic anhydride, and 3-allylsuccinic anhydride are preferred, and succinic anhydride and 3-allylsuccinic anhydride are more preferred.

As the cyclic phosphazene compound (I), cyclic phosphazene compounds, such as methoxypentafluorocyclotriphosphazene, ethoxypentafluorocyclotriphosphazene, phenoxypentafluorocyclotriphosphazene, etc., are preferred, and methoxypentafluorocyclotriphosphazene and ethoxypentafluorocyclotriphosphazene are more preferred.

A content of each of the aforementioned additives (D) to (I) is preferably 0.001 to 5% by mass in the nonaqueous electrolytic solution. When the content falls within this range, a surface film is sufficiently formed without causing an excessive increase of the thickness, and the stability of the surface film at a high temperature is much more enhanced. The content is more preferably 0.01% by mass or more, and still more preferably 0.1% by mass or more in the nonaqueous electrolytic solution, and an upper limit thereof is more preferably 3% by mass or less, and still more preferably 2% by mass or less.

[Production of Nonaqueous Electrolytic Solution]

The nonaqueous electrolytic solution of the present invention may be obtained, for example, by mixing the aforementioned nonaqueous solvent and adding the aforementioned electrolyte salt thereto.

At this time, the nonaqueous solvent to be used and the compounds to be added to the nonaqueous electrolytic solution are preferably purified in advance to decrease impurities as far as possible within the range where the productivity is not remarkably worsened.

[Energy Storage Device]

The energy storage device of the present invention is an energy storage device including a positive electrode, a negative electrode, and a nonaqueous electrolytic solution having an electrolyte salt dissolved in a nonaqueous solvent, the electrolyte salt including at least one first lithium salt selected from $LiPF_6$, $LiBF_4$, $LiN(SO_2F)_2$, $LiN(SO_2CF_3)_2$, and $LiN(SO_2C_2F_5)_2$, and at least one second lithium salt selected from a lithium salt having an oxalate structure, a lithium salt having a phosphate structure, and a lithium salt having an S=O group, with a sum total of the first lithium salt and the second lithium salt being four or more.

The nonaqueous electrolytic solution of the present invention may be used in the following first to fourth energy storage devices, in which the nonaqueous electrolyte salt may be used not only in the form of a liquid but also in the form of a gel. Furthermore, the nonaqueous electrolytic solution of the present invention may also be used for a solid polymer electrolyte salt. Among these, the nonaqueous electrolytic solution is preferably used in the first energy storage device using a lithium salt as the electrolyte salt (i.e., for a lithium battery) or in the fourth energy storage device (i.e., for a lithium ion capacitor), more preferably used in a lithium battery, and still more preferably used in a lithium secondary battery.

[First Energy Storage Device (Lithium Battery)]

The lithium battery as referred to in the present specification is a generic name for a lithium primary battery and a lithium secondary battery. In the present specification, the term "lithium secondary battery" is used as a concept also including a so-called lithium ion secondary battery. The lithium battery of the present invention includes a positive electrode, a negative electrode, and the aforementioned nonaqueous electrolytic solution having an electrolyte salt dissolved in a nonaqueous solvent. Other constitutional members than the nonaqueous electrolytic solution, such as the positive electrode, the negative electrode, etc., may be used without being particularly limited.

For example, as a positive electrode active material for a lithium secondary battery, a complex metal oxide containing lithium and one or more selected from cobalt, manganese, and nickel is used. Such a positive electrode active material may be used solely or in combination of two or more thereof.

Examples of such a lithium complex metal oxide include one or more selected from $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, and $LiCo_{0.98}Mg_{0.02}O_2$. These materials may be used as a combination, such as a combination of $LiCoO_2$ and $LiMn_2O_4$, a combination of $LiCoO_2$ and $LiNiO_2$, and a combination of $LiMn_2O_4$ and $LiNiO_2$.

For improving the safety on overcharging and the cycle property, and for enabling the use at a charge potential of 4.3 V or more, a part of the lithium complex metal oxide may be substituted with other elements. For example, a part of cobalt, manganese, or nickel may be substituted with at least one element selected from Sn, Mg, Fe, Ti, Al, Zr, Cr, V, Ga, Zn, Cu, Bi, Mo, and La, a part of O may be substituted with S or F, or the oxide may be coated with a compound containing any of such other elements.

Among those, a lithium complex metal oxide capable of being used at a charge potential of the positive electrode in a fully-charged state of 4.3 V or more based on Li, such as $LiCoO_2$, $LiMn_2O_4$, and $LiNiO_2$, is preferred; and a lithium complex metal oxide capable of being used at 4.4 V or more, such as $LiCo_{1-x}M_xO_2$ (wherein M represents one or more elements selected from Sn, Mg, Fe, Ti, Al, Zr, Cr, V, Ga, Zn, and Cu, and 0.001≤x≤0.05), $LiCo_{1/3}Ni_{1/3}Mn_{1/3}O_2$, $LiNi_{1/2}Mn_{3/2}O_4$, and a solid solution of $Li_2MnO_3$ and $LiMO_2$ (wherein M represents a transition metal, such as Co, Ni, Mn, Fe, etc.), is more preferred. The use of the lithium complex metal oxide capable of acting at a high charging voltage is liable to worsen the electrochemical characteristics particularly at a high temperature due to the reaction with the electrolytic solution on charging, but in the lithium secondary battery according to the present invention, worsening of the electrochemical characteristics may be suppressed. In particular, a battery with a positive electrode including Mn tends to have an increased resistance of the battery due to elution of an Mn ion from the positive electrode, thereby providing the tendency of worsening the electrochemical characteristics in the case of using it at a high temperature. However, the lithium secondary battery according to the present invention is preferred because worsening of the electrochemical characteristics may be suppressed.

Furthermore, a lithium-containing olivine-type phosphate may also be used as the positive electrode active material. In particular, a lithium-containing olivine-type phosphate including one or more selected from iron, cobalt, nickel, and manganese is preferred. Specific examples thereof include one or more selected from $LiFePO_4$, $LiCoPO_4$, $LiNiPO_4$, and $LiMnPO_4$. A part of such a lithium-containing olivine-type phosphate may be substituted with other element. A part of iron, cobalt, nickel, or manganese may be substituted with one or more elements selected from Co, Mn, Ni, Mg, Al, B, Ti, V, Nb, Cu, Zn, Mo, Ca, Sr, W, Zr, and the like, or the phosphate may be coated with a compound containing any of these other elements or with a carbon material. Among those, $LiFePO_4$ or $LiMnPO_4$ is preferred. The lithium-containing olivine-type phosphate may also be used, for example, in admixture with the aforementioned positive electrode active material.

Examples of the positive electrode for a lithium primary battery include an oxide or chalcogen compound of one or more metal elements, such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, CoO, and the like; a sulfur compound, such as $SO_2$, $SOCl_2$, etc.; a carbon fluoride (graphite fluoride) represented by a general formula $(CF_x)_n$; and the like. Among those, $MnO_2$, $V_2O_5$, graphite fluoride, and the like are preferred.

In the case where when 10 g of the aforementioned positive electrode active material is dispersed in 100 mL of distilled water, a pH of a supernatant thereof is 10.0 to 12.5, the improving effect of electrochemical characteristics at a high temperature is apt to be much more obtained, and hence, such is preferred. The case where the pH is 10.5 to 12.0 is more preferred.

In the case where Ni is included as an element in the positive electrode, the content of impurities, such as LiOH, etc., in the positive electrode active material tends to increase, and the improving effect of electrochemical characteristics at a high temperature is apt to be much more obtained, and hence, such is preferred. The case where an atomic concentration of Ni in the positive electrode active material is 5 to 25 atomic % is more preferred, and the case where the atomic concentration of Ni is 8 to 21 atomic % is especially preferred.

An electroconductive agent of the positive electrode is not particularly limited so long as it is an electron-conductive material that does not undergo chemical change. Examples thereof include graphites, such as natural graphite (e.g., flaky graphite, etc.), artificial graphite, etc.; one or more carbon blacks, such as acetylene black, Ketjen black, channel black, furnace black, lamp black, thermal black, etc.; and the like. The graphite and the carbon black may be appropriately mixed and used. An amount of the electroconductive agent added to a positive electrode mixture is preferably 1 to 10% by mass, and especially preferably 2 to 5% by mass.

The positive electrode may be produced in such a manner that the positive electrode active material is mixed with an electroconductive agent, such as acetylene black, carbon black, etc., and then mixed with a binder, such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), an ethylene-propylene-diene terpolymer, etc., to which is then added a high-boiling point solvent, such as 1-methyl-2-pyrrolidone, etc., followed by kneading to provide a positive electrode mixture, and the positive electrode mixture is applied onto a collector, such as an aluminum foil, a stainless steel-made lath plate, etc., dried, shaped under pressure, and then heat-treated in vacuum at a temperature of about 50° C. to 250° C. for about 2 hours.

A density of the positive electrode except for the collector is generally 1.5 g/cm³ or more, and for the purpose of further increasing a capacity of the battery, the density is preferably 2 g/cm³ or more, more preferably 3 g/cm³ or more, and still more preferably 3.6 g/cm³ or more. An upper limit thereof is preferably 4 g/cm³ or less.

As a negative electrode active material for a lithium secondary battery, one or more selected from metal lithium, a lithium alloy, a carbon material capable of absorbing and releasing lithium [e.g., graphitizable carbon, non-graphitizable carbon having a spacing of a (002) plane of 0.37 nm or more, graphite having a spacing of a (002) plane of 0.34 nm or less, etc.], tin (elemental substance), a tin compound, silicon (elemental substance), a silicon compound, and a lithium titanate compound, such as $Li_4Ti_5O_{12}$, etc., may be used.

Among the aforementioned negative electrode active material, in the ability of absorbing and releasing a lithium ion, the use of a high-crystalline carbon material, such as artificial graphite, natural graphite, etc., is more preferred, and the use of a carbon material having a graphite-type crystal structure in which a lattice (002) spacing ($d_{002}$) is 0.340 nm (nanometers) or less, and especially from 0.335 to 0.337 nm, is especially preferred. In particular, the use of artificial graphite particles having a bulky structure containing plural flattened graphite fine particles that are aggregated or bonded non-parallel to each other, or graphite particles produced through a spheroidizing treatment of flaky natural graphite particles by repeatedly applying a mechanical action, such as a compression force, a friction force, a shear force, etc., is preferred.

When a ratio I(110)/I(004) of a peak intensity I(110) of a (110) plane to a peak intensity I(004) of a (004) plane of the graphite crystal obtained through X-ray diffractometry of a negative electrode sheet that is shaped under pressure to such an extent that a density of the negative electrode except for the collector is 1.5 g/cm³ or more is 0.01 or more, the electrochemical characteristics are much more improved at a high temperature, and hence, such is preferred. The ratio I(110)/I(004) is more preferably 0.05 or more, and still more preferably 0.1 or more. An upper limit of the ratio I(110)/I (004) of the peak intensity is preferably 0.5 or less, and more preferably 0.3 or less because there may be the case where the crystallinity is worsened to lower the discharge capacity of the battery due to an excessive treatment.

When the high-crystalline carbon material (core material) is coated with a carbon material having lower crystallinity than the core material, the electrochemical characteristics at a high temperature become much more favorable, and hence, such is preferred. The crystallinity of the carbon material in the coating may be confirmed through TEM.

When the high-crystalline carbon material is used, there is a tendency that it reacts with the nonaqueous electrolytic solution on charging, thereby worsening the electrochemical characteristics at a low temperature or a high temperature due to an increase of interfacial resistance. However, in the lithium secondary battery according to the present invention, the electrochemical characteristics at a high temperature become favorable.

Suitable examples of the metal compound capable of absorbing and releasing lithium as a negative electrode active material include a compound containing at least one metal element, such as Si, Ge, Sn, Pb, P, Sb, Bi, Al, Ga, In, Ti, Mn, Fe, Co, Ni, Cu, Zn, Ag, Mg, Sr, Ba, etc. The metal compound may be in any form including an elemental substance, an alloy, an oxide, a nitride, a sulfide, a boride, an alloy with lithium, and the like, and any of an elemental substance, an alloy, an oxide, and an alloy with lithium are preferred because the battery capacity can be increased.

Above all, a compound containing at least one element selected from Si, Ge, and Sn is preferred, and a compound containing at least one element selected from Si and Sn is more preferred because the battery capacity can be increased.

The negative electrode may be produced in such a manner that the same electroconductive agent, binder, and high-boiling point solvent as in the production of the positive electrode as described above are used and kneaded to provide a negative electrode mixture, and the negative electrode mixture is then applied on a collector, such as a copper foil, etc., dried, shaped under pressure, and then heat-treated in vacuum at a temperature of about 50° C. to 250° C. for about 2 hours.

A density of the negative electrode except for the collector is generally 1.1 g/cm$^3$ or more, and for the purpose of further increasing a capacity of the battery, the density is preferably 1.5 g/cm$^3$ or more, and especially preferably 1.7 g/cm$^3$ or more. An upper limit thereof is preferably 2 g/cm$^3$ or less.

Examples of the negative electrode active material for a lithium primary battery include metal lithium and a lithium alloy.

The structure of the lithium battery is not particularly limited, and may be a coin-type battery, a cylinder-type battery, a prismatic battery, a laminate-type battery, or the like, each having a single-layered or multi-layered separator.

The separator for the battery is not particularly limited, and a single-layered or laminated micro-porous film of a polyolefin, such as polypropylene, polyethylene, etc., a woven fabric, a nonwoven fabric, and the like may be used.

The lithium secondary battery in the present invention has excellent electrochemical characteristics at a high temperature even when a final charging voltage is 4.2 V or more, particularly 4.3 V or more, and furthermore, the characteristics are favorable even at 4.4 V or more. A final discharging voltage may be generally 2.8 V or more, and further 2.5 V or more, and the final discharging voltage of the lithium secondary battery in the present invention may be 2.0 V or more. An electric current is not particularly limited, and in general, the battery may be used within a range of from 0.1 to 30 C. The lithium battery in the present invention may be charged and discharged at from −40 to 100° C., and preferably from −10 to 80° C.

In the present invention, as a countermeasure against the increase in the internal pressure of the lithium battery, there may also be adopted such a method that a safety valve is provided in a battery cap, or a cutout is provided in a component, such as a battery can, a gasket, etc. As a safety countermeasure for prevention of overcharging, a circuit cut-off mechanism capable of detecting the internal pressure of the battery to cut off the current may be provided in the battery cap.

[Second Energy Storage Device (Electric Double Layer Capacitor)]

The second energy storage device of the present invention is an energy storage device including the nonaqueous electrolytic solution of the present invention and storing energy by utilizing an electric double layer capacitance in an interface between the electrolytic solution and the electrode. One example of the present invention is an electric double layer capacitor. A most typical electrode active material which is used in this energy storage device is active carbon. The double layer capacitance increases substantially in proportion to a surface area.

[Third Energy Storage Device]

The third energy storage device of the present invention is an energy storage device including the nonaqueous electrolytic solution of the present invention and storing energy by utilizing a doping/dedoping reaction of the electrode. Examples of the electrode active material that is used in this energy storage device include a metal oxide, such as ruthenium oxide, iridium oxide, tungsten oxide, molybdenum oxide, copper oxide, etc., and a it-conjugated polymer, such as polyacene, a polythiophene derivative, etc. A capacitor using such an electrode active material is capable of storing energy following the doping/dedoping reaction of the electrode.

[Fourth Energy Storage Device (Lithium Ion Capacitor)]

The fourth energy storage device of the present invention is an energy storage device including the nonaqueous electrolytic solution of the present invention and storing energy by utilizing intercalation of a lithium ion into a carbon material, such as graphite, etc., as the negative electrode. This energy storage device is called a lithium ion capacitor (LIC). As the positive electrode, there are suitably exemplified one utilizing an electric double layer between an active carbon electrode and an electrolytic solution, one utilizing a doping/dedoping reaction of a π-conjugated polymer electrode, and the like. The electrolytic solution contains at least a lithium salt, such as LiPF$_6$, etc.

Examples 1 to 12 and Comparative Examples 1 to 5

[Production of Lithium Ion Secondary Battery]

94% by mass of LiNi$_{1/3}$Mn$_{1/3}$Co$_{1/3}$O$_2$ and 3% by mass of acetylene black (electroconductive agent) were added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet in a belt-like form. A density of the positive electrode except for the collector was 3.6 g/cm$^3$.

10% by mass of silicon (elemental substance), 80% by mass of artificial graphite (d$_{002}$=0.335 nm, negative electrode active material), and 5% by mass of acetylene black (electroconductive agent) were added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by cutting into a predetermined size, thereby producing a negative electrode sheet. A density of the negative electrode except for the collector was 1.5 g/cm$^3$. This electrode sheet was analyzed by X-ray diffractometry. As a result, a ratio [I(110)/I(004)] of the peak intensity I(110) of the (110) plane to the peak intensity I(004) of the (004) plane of the graphite crystal was 0.1.

The above-obtained positive electrode sheet, a microporous polyethylene film-made separator, and the above-obtained negative electrode sheet were laminated in this order, and a nonaqueous electrolytic solution having each of compositions shown in Tables 1 and 2 was added, thereby producing a laminate-type battery.

The term "MP" in the "Composition of nonaqueous electrolytic solution" in Table 1 means methyl propionate.

The concentrations of HF contained in the nonaqueous electrolytic solutions of Examples 1 and 2 were regulated to 38 ppm {(HF concentration)/(sum total of the second lithium salt containing fluorine concentration)≅1/284} and 7 ppm {(HF concentration)/(sum total of the second lithium salt containing fluorine concentration)≅1/1542}, respectively.

[Evaluation of Discharge Capacity Retention Rate after High-Temperature Charging Storage]

<Initial Discharge Capacity>

In a thermostatic chamber at 25° C., the laminate-type battery produced by the aforementioned method was charged up to a final voltage of 4.2 V with a constant current of 1 C and under a constant voltage for 3 hours and then discharged down to a final voltage of 2.75 V with a constant current of 1 C, thereby determining an initial discharge capacity at 25° C.

<High-Temperature Charging Storage Test>

Subsequently, in a thermostatic chamber at 60° C., this laminate-type battery was charged up to a final voltage of 4.3 V with a constant current of 1 C and under a constant voltage for 3 hours, and then stored for 6 months while being kept at 4.3 V. Thereafter, the battery was placed in a thermostatic chamber at 25° C., and once discharged down under a constant current of 1 C to a final voltage of 2.75 V.

<Discharge Capacity after High-Temperature Charging Storage>

Further thereafter, the discharge capacity after the high-temperature charging storage at 25° C. was determined in the same manner as in the measurement of the initial discharge capacity.

<Discharge Capacity Retention Rate after High-Temperature Charging Storage>

A discharge capacity retention rate after high-temperature charging storage was determined according to the following retention rate of discharge capacity at 25° C.

Discharge capacity retention rate (%) after high-temperature charging storage=(Discharge capacity at 25° C. after high-temperature charging storage)/(Initial discharge capacity at 25° C.)×100

[Evaluation of Input-Output Characteristics after High-Temperature Discharging Storage]

<Output Characteristic Test after High-Temperature Storage>

The output characteristic test of the battery was performed at −30° C. in a state of charge (SOC) of 50%. The laminate-type battery which had been subjected to the aforementioned high-temperature charging storage test was charged up to the SOC of 50% and then allowed to stand in an environment of −30° C. for 10 hours or more. The resulting battery was first discharged down to 1 C for 10 seconds, and subsequently, after going through the non-load state for 30 seconds, the charge was performed with the same current value as in the discharge for 10 seconds. Furthermore, after completion of charge, the battery was not loaded for 30 seconds and subsequently alternately discharged and charged with a current value of 2 C, 5 C, and 10 C in order in the same manner as described above. An upper limit voltage was set to 4.3 V, and a lower limit voltage was set to 2.0 V. However, when the lower limit voltage of discharge was set to 2.0 V, and the voltage was lower than this voltage during discharging, the test was finished upon this. The voltage after lapsing 5 seconds during discharging was read at every current value; a current-voltage characteristic diagram was prepared; a current value (I) at an arbitrary voltage (V) was read using this current-voltage characteristic diagram; and a product thereof (V×I) was defined as an initial output of the battery.

<Input Characteristic Test after High-Temperature Storage>

The charging and discharging were performed in the same manner as in the aforementioned output characteristic test, the voltage after lapsing 5 seconds during charging was read at every current value, and a current-voltage characteristic diagram was prepared. As for the input characteristics of the battery, a current value (I) at an arbitrary voltage (V) was read using this current-voltage characteristic diagram, and a product thereof (V×I) was defined as input characteristics of the battery.

As for the output characteristics and input characteristics, relative output characteristics and input characteristics were evaluated on a basis when the output characteristics and input characteristics of Comparative Example 1 were defined as 100%, respectively.

TABLE 1

| | Composition of electrolyte salt Composition of nonaqueous electrolytic solution (Volume ratio of solvent) | Oxalate structure-containing lithium salt (Content in nonaqueous electrolytic solution) (M) | Phosphate structure-containing lithium salt (Content in nonaqueous electrolytic solution) (M) | S=O group-containing lithium salt (Content in nonaqueous electrolytic solution) (M) | Discharge capacity retention rate after high-temperature charging storage at 60° C. (%) | Output characteristics after high-temperature charging storage at 60° C. (%) | Input characteristics after high-temperature charging storage at 60° C. (%) |
|---|---|---|---|---|---|---|---|
| Example 1 | 1.2M LiPF$_6$ EC/DMC/MEC (30/65/5) | LiBOB (0.03) | LiPO$_2$F$_2$ (0.1) | LMS (0.04) | 76 | 123 | 120 |
| Example 2 | 1.2M LiPF$_6$ EC/DMC/MEC (30/65/5) | LiBOB (0.03) | LiPO$_2$F$_2$ (0.1) | LMS (0.04) | 77 | 125 | 122 |
| Example 3 | 1.2M LiPF$_6$ EC/PC/DMC/MEC (25/5/65/5) | LiBOB (0.03) | LiPO$_2$F$_2$ (0.1) | LMS (0.04) | 76 | 126 | 123 |
| Example 4 | 1.2M LiPF$_6$ EC/PC/MP/DMC/MEC (25/5/5/60/5) | LiBOB (0.03) | LiPO$_2$F$_2$ (0.1) | LMS (0.04) | 78 | 129 | 127 |
| Example 5 | 1.2M LiPF$_6$ EC/PC/VC/MP/DMC/MEC (23/5/2/5/60/5) | LiDFOB (0.03) | LiPO$_2$F$_2$ (0.1) | LMS (0.04) | 76 | 131 | 130 |
| Example 6 | 1.2M LiPF$_6$ EC/PC/VC/MP/DMC/MEC (23/5/2/5/60/5) | LiDFOP (0.03) | LiPO$_2$F$_2$ (0.1) | FSO$_3$Li (0.08) | 72 | 123 | 125 |

TABLE 1-continued

| | Composition of electrolyte salt Composition of nonaqueous electrolytic solution (Volume ratio of solvent) | Oxalate structure-containing lithium salt (Content in nonaqueous electrolytic solution) (M) | Phosphate structure-containing lithium salt (Content in nonaqueous electrolytic solution) (M) | S=O group-containing lithium salt (Content in nonaqueous electrolytic solution) (M) | Discharge capacity retention rate after high-temperature charging storage at 60° C. (%) | Output characteristics after high-temperature charging storage at 60° C. (%) | Input characteristics after high-temperature charging storage at 60° C. (%) |
|---|---|---|---|---|---|---|---|
| Example 7 | 1.2M LiPF$_6$ EC/PC/VC/MP/DMC/MEC (23/5/2/5/60/5) | LiDFOP (0.03) | — | LMS (0.04) + LES (0.08) | 78 | 125 | 127 |
| Example 8 | 1.2M LiPF$_6$ EC/PC/VC/MP/DMC/MEC (23/5/2/5/60/5) | — | LiPO$_2$F$_2$ (0.1) | LMS (0.04) + LES (0.08) | 74 | 130 | 135 |
| Example 9 | 1.2M LiPF$_6$ EC/PC/VC/MP/DMC/MEC (23/5/2/5/60/5) | LiTFOP (0.03) | — | LMS (0.04) + FSO$_3$Li (0.08) | 75 | 122 | 126 |
| Example 10 | 1.2M LiPF$_6$ EC/PC/VC/MP/DMC/MEC (23/5/2/5/60/5) | LiTFOP (0.003) + LiDFOP (0.027) | LiPO$_2$F$_2$ (0.1) | — | 72 | 125 | 121 |
| Example 11 | 1.1M LiPF$_6$ + 0.1M LiBF$_4$ EC/PC/VC/MP/DMC/MEC (23/5/2/5/60/5) | LiBOB (0.03) | LiPO$_2$F$_2$ (0.1) | LMS (0.04) | 78 | 131 | 131 |
| Example 12 | 0.75M LiPF$_6$ 0.45M LiFSI EC/PC/VC/MP/DMC/MEC (23/5/2/5/60/5) | LiBOB (0.03) | LiPO$_2$F$_2$ (0.1) | LMS (0.04) | 80 | 133 | 138 |
| Comparative Example 1 | 1.2M LiPF$_6$ EC/DMC/MEC (30/65/5) | — | — | — | 48 | 100 | 100 |
| Comparative Example 2 | 1.2M LiPF$_6$ EC/DMC/MEC (30/65/5) | LiBOB (0.03) | LiPO$_2$F$_2$ (0.1) | — | 70 | 115 | 105 |
| Comparative Example 3 | 1.2M LiPF$_6$ EC/DMC/MEC (30/65/5) | LiDFOP (0.03) | LiPO$_2$F$_2$ (0.1) | — | 68 | 118 | 111 |
| Comparative Example 4 | 1.2M LiPF$_6$ EC/DMC/MEC (30/65/5) | — | LiPO$_2$F$_2$ (0.1) | FSO$_3$Li (0.08) | 62 | 116 | 109 |
| Comparative Example 5 | 1.2M LiPF$_6$ EC/DMC/MEC (30/65/5) | LiTFOP (0.003) + LiDFOP (0.027) | — | — | 68 | 112 | 103 |

The meanings of the abbreviations in Table 1 are as follows. The same is also applicable in Tables 2 and 3.
LiBOB: Lithium bis(oxalate)borate
LiDFOB: Lithium difluoro(oxalate)borate
LiTFOP: Lithium tetrafluoro(oxalate)phosphate
LiDFOP: Lithium difluorobis(oxalate)phosphate
LMS: Lithium methyl sulfate
LES: Lithium ethyl sulfate Example 13 and Comparative Examples 6 and 7

Positive electrode sheets were produced by using lithium nickel manganate (LiNi$_{1/2}$Mn$_{3/2}$O$_4$) (positive electrode active material) in place of the positive electrode active material used in Example 1 and Comparative Examples 1 and 2.

94% by mass of lithium nickel manganate and 3% by mass of acetylene black (electroconductive agent) were added to and mixed with a solution which had been prepared by dissolving 3% by mass of polyvinylidene fluoride (binder) in 1-methyl-2-pyrrolidone in advance, thereby preparing a positive electrode mixture paste.

Laminate-type batteries were produced and subjected to battery evaluation in the same manner as in Example 1 and Comparative Example 1, except that this positive electrode mixture paste was applied onto one surface of an aluminum foil (collector), dried, and treated under pressure, followed by cutting into a predetermined size to produce positive electrode sheets; and that on the battery evaluation, the final charging voltage was changed to 4.9 V, and the final discharging voltage was changed to 2.7 V. The results are shown in Table 2.

TABLE 2

| | Composition of electrolyte salt Composition of nonaqueous electrolytic solution (Volume ratio of solvent) | Oxalate structure-containing lithium salt (Content in nonaqueous electrolytic solution) (M) | Phosphate structure-containing lithium salt (Content in nonaqueous electrolytic solution) (M) | S=O group-containing lithium salt (Content in nonaqueous electrolytic solution) (M) | Discharge capacity retention rate after high-temperature charging storage at 60° C. (%) | Output characteristics after high-temperature charging storage at 60° C. (%) | Input characteristics after high-temperature charging storage at 60° C. (%) |
|---|---|---|---|---|---|---|---|
| Example 13 | 0.75M LiPF$_6$ 0.45M LiFSI EC/DMC/MEC (30/65/5) | — | LiPO$_2$F$_2$ (0.1) | LMS (0.04) + LES (0.08) | 72 | 129 | 132 |
| Comparative Example 6 | 1.2M LiPF$_6$ EC/DMC/MEC (30/65/5) | — | — | — | 38 | 100 | 100 |
| Comparative Example 7 | 1.2M LiPF$_6$ EC/DMC/MEC (30/65/5) | LiBOB (0.025) | LiPO$_2$F$_2$ (0.08) | — | 65 | 112 | 106 |

Example 14 and Comparative Examples 8 and 9

Negative electrode sheets were produced by using lithium titanate (Li$_4$Ti$_5$O$_{12}$) (negative electrode active material) in place of the negative electrode active material used in Example 1 and Comparative Examples 1 and 2.

80% by mass of lithium titanate and 15% by mass of acetylene black (electroconductive agent) were added to and mixed with a solution which had been prepared by dissolving 5% by mass of polyvinylidene fluoride (binder) in 1-methyl-2-pyrrolidone in advance, thereby preparing a negative electrode mixture paste.

Laminate-type batteries were produced and subjected to battery evaluation in the same manner as in Example 1 and Comparative Example 1, except that this negative electrode mixture paste was applied onto one surface of a copper foil (collector), dried, and treated under pressure, followed by cutting into a predetermined size to produce negative electrode sheets; and that on the battery evaluation, the final charging voltage was changed to 2.8 V, the final discharging voltage was changed to 1.2 V, and a composition of the non-aqueous electrolyte solution was changed to a predetermined one. The results are shown in Table 3.

The term "LiTFMSB" in Table 3 means lithium trifluoro ((methane sulfonyl)oxy)borate.

In all of the lithium secondary batteries of Examples 1 to 12, in the nonaqueous electrolytic solution of the present invention, the discharge capacity retention rate after high-temperature storage, the low-temperature output characteristics after high-temperature storage, and the low-temperature input characteristics after high-temperature storage are explicitly improved as compared with the case of including three kinds of lithium salts selected from the first lithium salt and the second lithium salt of the lithium secondary batteries and the like as in Comparative Example 1 in the case where the lithium salt according to the present invention is not added, Comparative Example 2 in the case where the compounds described in PTL 1 are added, Comparative Example 3 in the case where the compounds described in PTL 2 are added, Comparative Example 4 in the case where the compounds described in PTL 3 are added, and Comparative Example 5 in the case where the compounds described in PTL 4 are added.

In the light of the above, it is noted that the discharge capacity retention rate after high-temperature storage, the low-temperature output characteristics after high-temperature storage, and the low-temperature input characteristics after high-temperature storage of the present invention are peculiar effects in the case of containing the first lithium salt

TABLE 3

| | Composition of electrolyte salt Composition of nonaqueous electrolytic solution (Volume ratio of solvent) | Oxalate structure-containing lithium salt (Content in nonaqueous electrolytic solution) (M) | Phosphate structure-containing lithium salt (Content in nonaqueous electrolytic solution) (M) | S=O group-containing lithium salt (Content in nonaqueous electrolytic solution) (M) | Discharge capacity retention rate after high-temperature charging storage at 60° C. (%) | Output characteristics after high-temperature charging storage at 60° C. (%) | Input characteristics after high-temperature charging storage at 60° C. (%) |
|---|---|---|---|---|---|---|---|
| Example 14 | 1.1M LiPF$_6$ + 0.1M LiBF$_4$ PC/DMC/MEC (30/65/5) | — | LiPO$_2$F$_2$ (0.08) | LiTFMSB (0.08) | 89 | 118 | 123 |
| Comparative Example 8 | 1.2M LiPF$_6$ PC/DMC/MEC (30/65/5) | — | — | — | 71 | 100 | 100 |
| Comparative Example 9 | 1.2M LiPF$_6$ PC/DMC/MEC (30/65/5) | LiBOB (0.025) | LiPO$_2$F$_2$ (0.08) | — | 85 | 108 | 102 | and three or more lithium salts selected from the second lithium salt, i.e., four or more lithium salts in total.

In addition, from comparison between Example 13 and Comparative Examples 6 and 7, in which lithium nickel manganate is used for the positive electrode, and from comparison between Example 14 and Comparative Examples 8 and 9, in which lithium titanate ($Li_4Ti_5O_{12}$) is used for the negative electrode, the same effects are observed. In consequence, it is evident that the effects of the present invention are not effects relying upon the specified positive electrode or negative electrode.

In addition, the nonaqueous electrolytic solution of the present invention also has an effect for improving the discharging properties in the case of using a lithium primary battery at a high temperature.

INDUSTRIAL APPLICABILITY

The nonaqueous electrolytic solution of the present invention is not only able to improve electrochemical characteristics at a high temperature and much more improve a discharge capacity retention rate and low-temperature output characteristics after a high-temperature storage test but also able to improve low-temperature input characteristics even for high-density electrodes, so that it is useful for an energy storage device, such as a lithium secondary battery, etc.

The invention claimed is:

1. A nonaqueous electrolytic solution, comprising an electrolyte salt dissolved in a nonaqueous solvent,
the nonaqueous electrolytic solution comprising at least four different lithium salts, wherein the lithium salts comprise:
at least one first lithium salt (I) selected from the group consisting of $LiPF_6$, $LiBF_4$, $LiN(SO_2F)_2$, $LiN(SO_2CF_3)_2$, and $LiN(SO_2C_2F_5)_2$; and
at least one second lithium salt (II) comprising
at least one lithium salt (IIa) having an oxalate structure, and
at least one lithium salt (IIb) selected from the group consisting of a lithium salt having a phosphate structure and a lithium salt having an S=O group.

2. The nonaqueous electrolytic solution of claim 1, wherein the nonaqueous electrolytic solution comprises at least one lithium salt (IIa) having an oxalate structure and two or more lithium salts (IIb) selected from the group consisting of a lithium salt having a phosphate structure and a lithium salt having an S=O group as the second lithium salt.

3. The nonaqueous electrolytic solution of claim 1, wherein a ratio of a total molar concentration of the first lithium salt (I) to a total molar concentration of the second lithium salt (II) {(first lithium salt concentration)/(second lithium salt concentration)} is 1 or more.

4. The nonaqueous electrolytic solution of claim 1, wherein the nonaqueous electrolytic solution comprises one or more lithium salts having an oxalate structure, one or more lithium salts having a phosphate structure, and one or more lithium salts having an S=O group.

5. The nonaqueous electrolytic solution of claim 1, wherein the nonaqueous electrolytic solution comprises at least $LiPF_6$ as the first lithium salt.

6. The nonaqueous electrolytic solution of claim 1, wherein the lithium salt having an oxalate structure is at least one selected from the group consisting of lithium bis(oxalate)borate, lithium difluoro(oxalate)borate, lithium tetrafluoro(oxalate)phosphate, and lithium difluorobis(oxalate)phosphate.

7. The nonaqueous electrolytic solution of claim 1, wherein the lithium salt having a phosphate structure is at least one selected from the group consisting of lithium difluorophosphate and lithium fluorophosphate.

8. The nonaqueous electrolytic solution of claim 1, wherein the lithium salt having an S=O group is at least one selected from the group consisting of lithium fluorosulfonate, lithium methyl sulfate, lithium ethyl sulfate, lithium 2,2,2-trifluoroethyl sulfate, lithium trifluoro((methanesulfonyl)oxy)borate, and lithium pentafluoro((methanesulfonyl)oxy)phosphate.

9. The nonaqueous electrolytic solution of claim 1, wherein the nonaqueous solvent comprises a cyclic carbonate and a linear ester.

10. The nonaqueous electrolytic solution of claim 9, wherein the cyclic carbonate comprises at least one selected from the group consisting of ethylene carbonate, propylene carbonate, 4-fluoro-1,3-dioxolan-2-one, vinylene carbonate, and 4-ethynyl-1,3-dioxolan-2-one.

11. The nonaqueous electrolytic solution of claim 9, wherein the linear ester comprises a linear carboxylic acid ester.

12. An energy storage device comprising a positive electrode, a negative electrode, and a nonaqueous electrolytic solution according to claim 1.

13. The energy storage device of claim 12, wherein an active material of the positive electrode is a complex metal oxide comprising lithium and at least one selected from the group consisting of cobalt, manganese and nickel, or a lithium-containing olivine-type phosphate comprising at least one selected from the group consisting of iron, cobalt, nickel and manganese.

14. The energy storage device of claim 12, wherein an active material of the negative electrode comprises at least one selected from the group consisting of metal lithium, a lithium alloy, a carbon material capable of absorbing and releasing lithium, tin, a tin compound, silicon, a silicon compound, and a lithium titanate compound.

15. The nonaqueous electrolytic solution of claim 1, wherein the nonaqueous electrolytic solution comprises two kinds of a lithium salt having two oxalate structures and a lithium salt having one oxalate structure as the second lithium salt.

16. The nonaqueous electrolytic solution of claim 1, wherein the nonaqueous electrolytic solution comprises three kinds of a lithium salt having two oxalate structures, a lithium salt having one oxalate structure, and a lithium salt having a phosphate structure as the second lithium salt.

17. The nonaqueous electrolytic solution of claim 1, wherein the nonaqueous electrolytic solution comprises a lithium salt having a oxalate structure in an amount of 0.001 M or more and 0.2 M or less in the nonaqueous electrolytic solution as the second lithium salt.

18. The nonaqueous electrolytic solution of claim 1, wherein the nonaqueous electrolytic solution comprises a lithium salt having a phosphate structure in an amount of 0.001 M or more and 0.3 M or less in the nonaqueous electrolytic solution as the second lithium salt.

19. The nonaqueous electrolytic solution of claim 1, wherein the nonaqueous electrolytic solution comprises a lithium salt having an S=O group in an amount of 0.001 M or more and 0.3 M or less in the nonaqueous electrolytic solution as the second lithium salt.

20. The nonaqueous electrolytic solution of claim 1, wherein
the first lithium salt is $LiPF_6$, and
the second lithium salt is at least one selected from the group consisting of Lithium bis(oxalate)borate/$LiPO_2F_2$/lithium methyl sulfate, lithium difluoro(oxalate)borate/$LiPO_2F_2$/lithium methyl sulfate, lithium difluorobis(oxalate)phosphate/$LiPO_2F_2$/$FSO_3Li$, lithium difluorobis(oxalate)phosphate/lithium methyl sulfate/lithium ethyl sulfate, lithium tetrafluoro(oxalate)phosphate/lithium methyl sulfate/$FSO_3Li$, and lithium tetrafluoro(oxalate)phosphate/lithium difluorobis(oxalate)phosphate/$LiPO_2F_2$.

21. The nonaqueous electrolytic solution of claim 1, wherein
the first lithium salt is $LiPF_6$ and $LiBF_4$, and
the second lithium salt is lithium bis(oxalate)borate/$LiPO_2F_2$/lithium methyl sulfate.

22. The nonaqueous electrolytic solution of claim 1, wherein
the first lithium salt is $LiPF_6$ and $LiN(SO_2F)_2$, and
the second lithium salt is lithium bis(oxalate)borate/$LiPO_2F_2$/lithium methyl sulfate.

* * * * *